United States Patent [19]
Yoshibe et al.

[11] Patent Number: 5,243,374
[45] Date of Patent: Sep. 7, 1993

[54] LENS BARREL HAVING A POWER ZOOMING FUNCTION AND A CAMERA SYSTEM

[75] Inventors: Koshi Yoshibe, Yokohama; Hideshi Naito, Tokyo, both of Japan

[73] Assignee: Nikon Corporation, Tokyo, Japan

[21] Appl. No.: 838,320

[22] Filed: Jun. 15, 1992

[30] Foreign Application Priority Data

Jun. 25, 1991 [JP] Japan .................. 3-180305

[51] Int. Cl.⁵ .............. G03B 5/00; G03B 13/36; G02B 15/00; G02B 7/09
[52] U.S. Cl. .................. 354/400; 354/195.1
[58] Field of Search ........... 354/400, 195.1, 195.12; 359/696, 823, 824

[56] References Cited

FOREIGN PATENT DOCUMENTS 63-113512  5/1988  Japan .
3-236006   6/1991  Japan .

Primary Examiner—W. B. Perkey
Attorney, Agent, or Firm—Shapiro and Shapiro

[57] ABSTRACT

A power zooming lens barrel, which is mounted on a camera body having an auto-focus driving unit for performing a focusing driving to focus an objective image, comprises a zooming driving mechanism unit which is coupled to the auto-focus driving unit for driving a zooming lens group by the driving power from the auto-focus driving unit, a switching unit for actuating a zooming operation, and a zooming control unit for operating the auto-focus driving unit for a zooming driving through the zooming driving mechanism unit when the zooming operation is actuated by the switching unit.

4 Claims, 3 Drawing Sheets

LENS BARREL HAVING A POWER ZOOMING FUNCTION AND A CAMERA SYSTEM

BACKGROUND OF THE INVENTION

1. Field of the Invention

The present invention relates to a lens having a power zooming function and a camera. More particularly, the invention relates to a technique to miniaturize and lighten a lens barrel as well as to implement an effective utilization of the auto-focus driving unit in a camera body using a driving unit for focusing installed in the camera body as a driving unit for the power zooming, for example.

2. Related Background Art

FIG. 1 illustrates the structure of a conventional auto-focus camera schematically. The apparatus shown in FIG. 1 comprises an exchangeable zoom lens barrel 117 and a camera body 32. In the zoom lens barrel 117, a motor 118 for driving the zooming lens group and a motor 114 for driving the focusing lens group are provided. Then, in response to the operation of a zooming switch 111, the driving power of the aforesaid zooming switch 111, the driving power of the aforesaid zooming lens group driving motor 118 is transmitted to a zooming cam barrel 104 through a pinion gear 110 to rotate the aforesaid zooming cam barrel 104 for the execution of an electrically driven zooming operation. Also, the driving power of the focusing lens group driving motor 114, which is another motor independent of the aforesaid zooming lens group driving motor 118, is transmitted to the focusing cam barrel 107 through a pinion gear 115 to rotate the aforesaid focusing cam barrel 107 for the execution of an electrically driven focusing operation.

In this respect, the driving signals for driving the focusing lens group driving motor 114 are generated by a CPU 116 in the lens to which the control signals generated by a metering photoelectric conversion unit 30, focusing control circuit 31, and others in the camera body 32 are inputted. Also, in the camera body 32, a focusing motor 22 and others are provided for a lens of a type in which no motor is installed for driving the focusing lens group.

Also, FIG. 2 illustrates another example of the structure of an auto-focus camera having a conventional power zooming function. In this camera, no motor for driving the focusing lens group is provided in the zoom lens barrel 217. Its focusing is performed by a focusing driving motor 22 in the camera body 32. In other words, the driving power of the motor 22 in the camera body 32 is transmitted to gears 23 and 21a, a driving shaft 21, and a coupling unit 21b on the camera body side. Then, from the aforesaid coupling unit 21b, the power is transmitted to the focusing cam barrel 207 through a coupling unit 219b on the lens side, a coupling shaft 219, and a gear 219a to rotate it for the execution of an electrically driven focusing operation.

Also, regarding the zooming operation, the driving power of the zooming lens group driving motor 218 which is provided in the zoom lens barrel 217 is transmitted to a zooming cam barrel 204 through a pinion gear 210 in response to the operation of a zooming actuation switch 211 as in the case of the embodiment described in conjunction with FIG. 1, and the aforesaid zooming cam barrel 204 is caused to rotate for the execution of an electrically driven zooming operation. In this respect, the signals for driving the focusing motor 22 on the camera body side 32 is generated when the focus driving control signals, which are obtained by a photoelectric conversion unit 30, focusing control circuit 31, and others, are inputted into a CPU 216 in the lens barrel 217. Thus, the CPU 216 controls the focusing motor 22 on the camera body side 32.

Also, in the above-mentioned apparatuses according to the prior art, the one shown in FIG. 1 is provided with the focusing lens group driving motor in the lens barrel to perform a high-speed focusing for various types of lenses. However, as a zooming lens group driving motor is mounted in the same lens barrel, there are disadvantages that the lens barrel becomes large and its weight becomes inevitably heavier. Also, when a zoom lens barrel such as this is used by mounting it on the camera body in which a focusing lens group driving motor is installed, the focusing lens group driving motor provided for the camera body does not render any service at all. This is obviously inefficient.

Also, in a case of the conventional auto-focus camera system, as shown in FIG. 2, where its focusing lens group is driven by the use of a focusing lens group driving motor in the camera body through the mechanical coupling, it is necessary to provide a motor and its driving mechanism in the lens barrel only for the purpose of driving the zooming lens group. In this case, too, there are disadvantages that the lens barrel becomes large and its weight becomes heavier.

SUMMARY OF THE INVENTION

In consideration of these problems existing in the conventional apparatuses, the present invention is designed. It is therefore an object of the present invention to provide a small and compact structure thereby to enable the apparatus to perform its electrically driven focusing operation and zooming operation efficiently.

In order to solve the aforesaid subject, there is provided according to the present invention a power zooming lens which can be mounted to a camera body in which an auto-focus driving unit is provided for the operation of a focusing driving in accordance with the defocus amount of an objective image, and the aforesaid power zooming lens comprises a zooming driving mechanism for driving the zooming lens group, which is coupled to the auto-focus driving unit in the camera body and is driven by the driving power generated by the aforesaid auto-focus driving unit; a switching unit for actuating a zooming operation; and a zooming control unit for allowing the auto-focus diving unit to be operated for the zooming driving operation when a zooming operation is actuated by the aforesaid switching unit.

Also, according to the present invention, there is provided a camera comprising a focus detection unit for detecting the defocus amount of an objective image; a camera body provided with an auto-focus driving unit which performs a focusing driving on the basis of the defocus amount detected by the aforesaid focus detection unit; a zoom lens provided with a zooming driving mechanism for driving its zooming lens group by the driving power of the aforesaid auto-focus driving unit by being coupled to the auto-focus driving unit in the aforesaid camera body; a switching unit for actuating a zooming operation; and a zooming control unit for operating the auto-focus driving unit for the zooming driving when the zooming operation is actuated by the aforesaid switching unit.

In the power zooming lens barrel of the above-mentioned structure, when the aforesaid switching unit is operated to actuate the zooming operation, the zooming control unit causes the auto-focus servo operation of the auto-focus driving unit in the camera body to be disabled, and allows the aforesaid auto-focus driving unit to operate the zooming driving. At this juncture, the zooming driving mechanism coupled to the aforesaid auto-focus driving unit drives the zooming lens group in the lens barrel. In this way, the power zooming operation is executed using the auto-focus driving unit. In this respect, if a conventional lens, in which unlike a zoom lens barrel of the present invention, no zooming driving mechanism and others are provided, is mounted to a camera body provided with the aforesaid auto-focus driving unit, the aforesaid auto-focus driving unit serves to operate as its focusing lens group driving unit.

Also, a power zooming lens barrel according to the present invention is desirably adopted in a case where a focusing lens group driving motor is provided in the lens barrel for the purpose of obtaining the maximal driving speed, driving power, and other performances of each of the lenses, for example. Thus, making it unnecessary to provide a zooming driving motor anew in the lens barrel. As a result, a disadvantage such a provision of a large lens barrel and the resultant heavier weight thereof can be eliminated among some others.

Further, in a camera having a power zooming function according to the present invention set forth above, when the switching unit is operated to actuate a zooming operation as in the case of the above-mentioned power zooming lens barrel, the zooming control unit causes the auto-focus operation of the auto-focus driving unit in the camera body to be disabled and allows the auto-focus driving unit to operate its zooming driving. When the auto-focus driving unit is thus operated, the zooming lens group is driven through the zooming driving mechanism to perform the zooming operation.

DETAILED DESCRIPTION OF THE PREFERRED EMBODIMENTS

Figure 1:
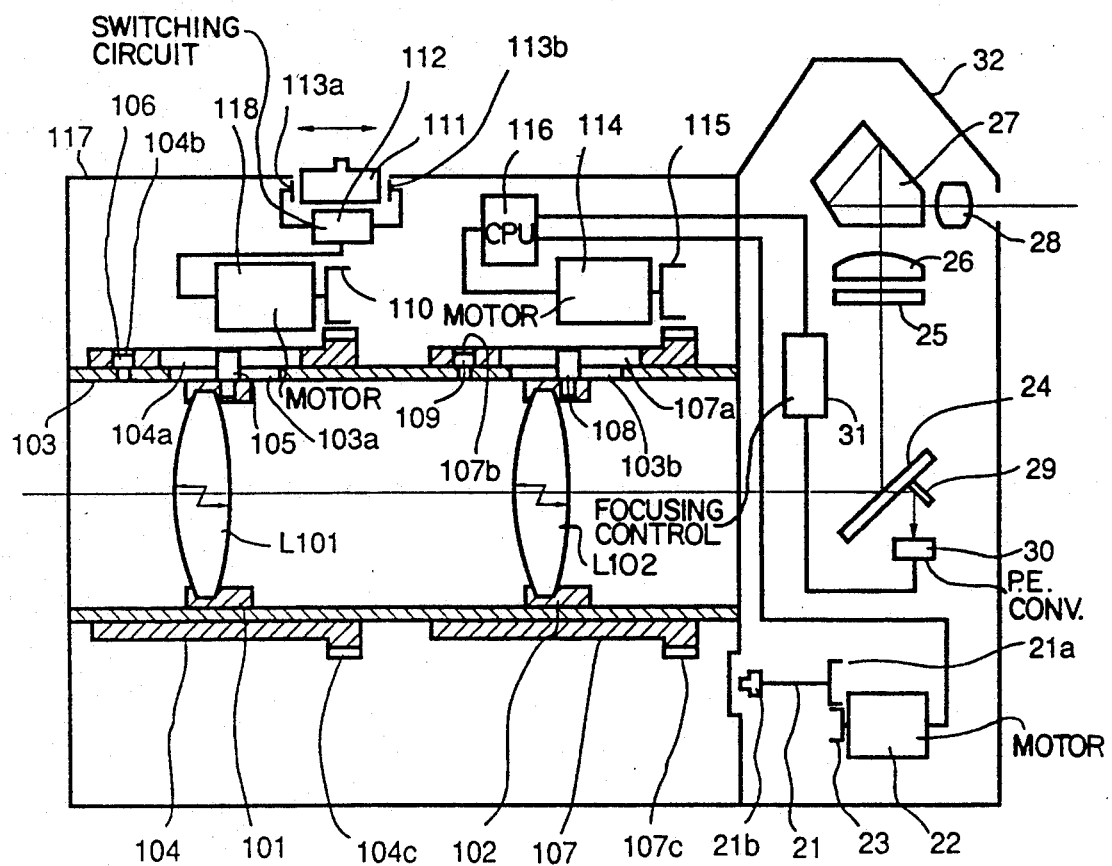
FIG. 1 is a cross-sectional view illustrating the structure of an example of a zoom lens barrel and camera body according to the conventional art.
Figure 2:
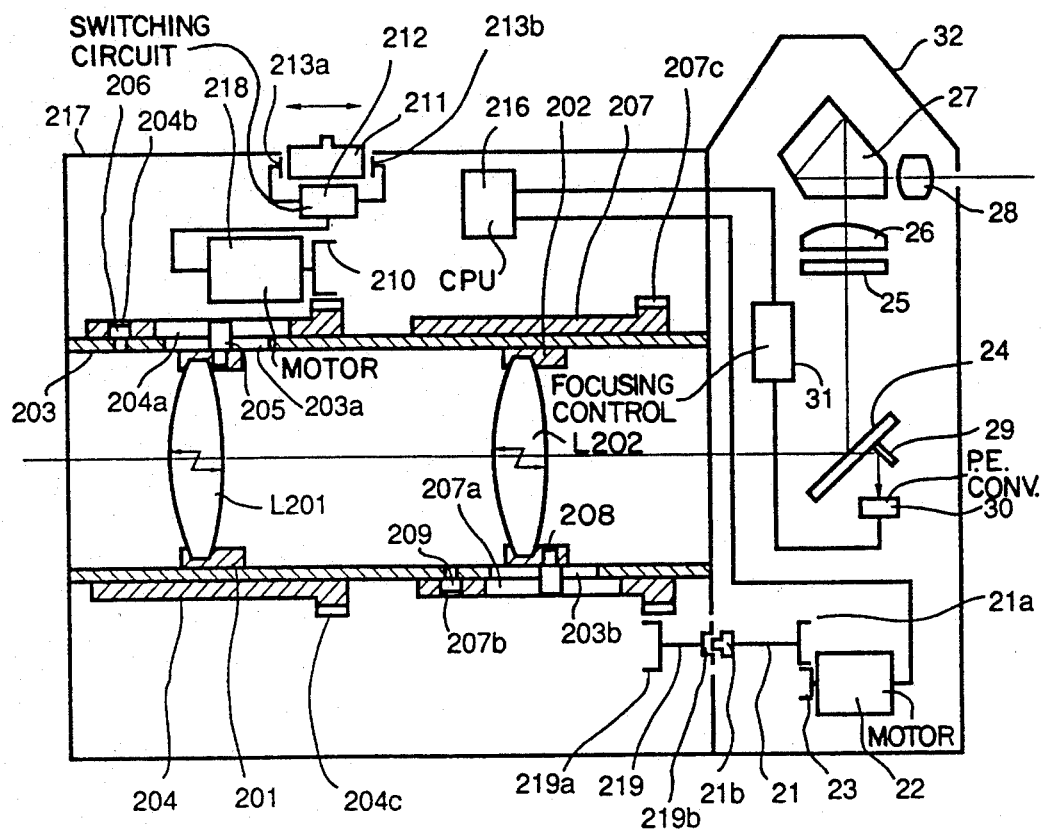
FIG. 2 is a cross-sectional view illustrating the structure of an another example of a zoom lens barrel and camera body according to the conventional art.
Figure 3:
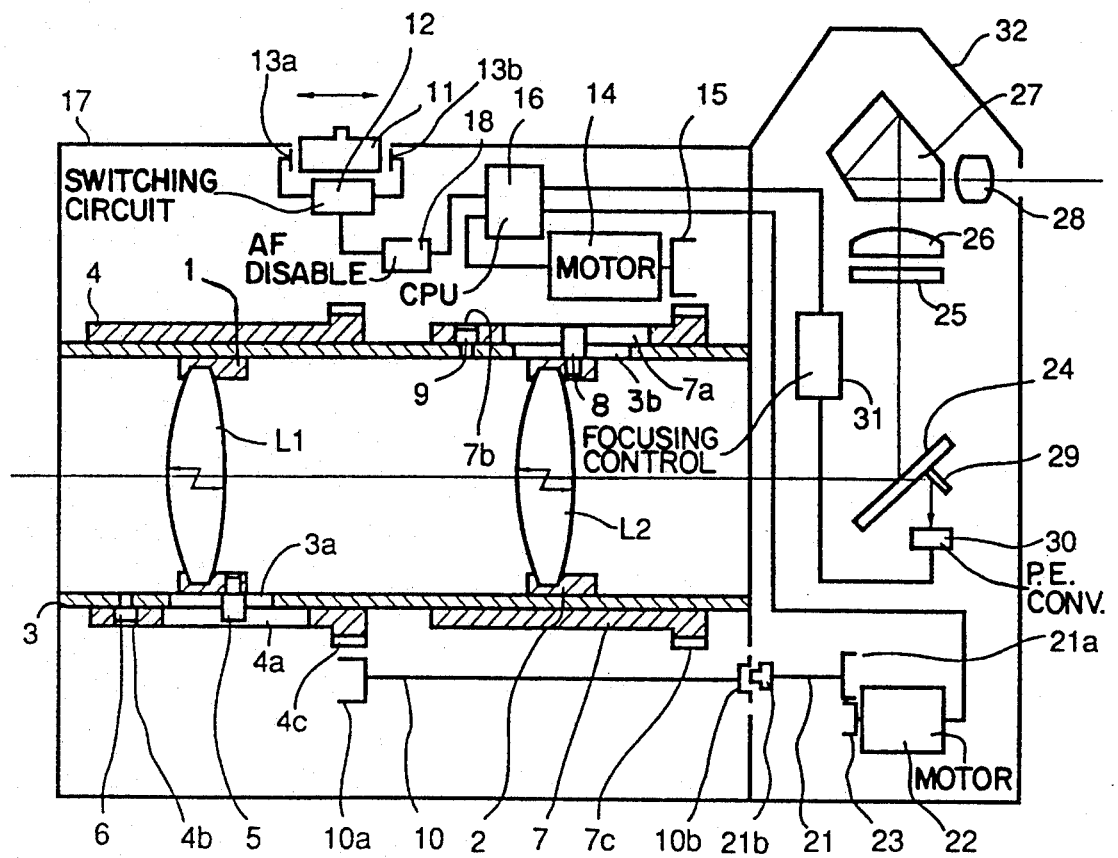
FIG. 3 is a cross-section view schematically showing the structure of a camera system including a zoom lens barrel according to a first embodiment of the present invention.

Hereinafter, in reference to the accompanying drawings, the description will be made of the embodiments according to the present invention. FIG. 3 is a view showing a camera system using a power zooming lens barrel according to an embodiment of the present invention. In FIG. 3, the camera system is provided with a camera body 32 and a power zooming lens barrel 17 to be mounted on this camera body 32. The power zooming lens barrel 17 comprises a zooming lens group L1 and focusing lens group L2, a sliding switch 11 for actuating a zooming, a CPU 16, a focusing motor 14, and others. Also, the camera body 32 is structured with a focusing driving motor 22, a main mirror 24, a submirror 29, a metering photoelectric conversion unit 30, a focusing control circuit 31, and others.

In the zoom lens barrel 17, the zooming lens group L1 is held by a movable barrel 1. Also, in the movable barrel 1, there are installed a zooming cam pin 5 which is fitted both to a groove 3a on a fixed barrel 3 for the linear zooming advancement and a zooming cam groove 4a on a zooming cam barrel 4 by a screw fitting between the threaded portion of the zooming cam pin 5 and the grooves to regulate the movement of the zooming lens group L1 in the direction of its thrust.

Also, on the end portion of the zooming cam barrel 4, a segmental gear 4c is cut to engage with a gear 10a cut on the other end of the coupling ring shaft 10 on the lens barrel side which has a concave coupling portion 10b, for example, projected outside from the lens barrel 17 to transmit the rotation of the aforesaid coupling ring shaft 10 to the zooming cam barrel 4. Also, on the zooming cam barrel 4, a peripheral groove 4b is provided to regulate the movement of the zooming cam barrel 4 in its rotational direction by fitting it to a pin 6 with a threaded portion which is mounted on the fixed barrel 3 by a screw fitting.

Subsequently, the structure of the zooming mechanism driving unit will be described. A sliding switch 11, which is projected from the barrel main body of the zoom lens barrel 17 and is arranged to slide in the direction of thrust, for example, can be selected to be in one of the three positions, the neutral position (which is the position shown in FIG. 3), position of the normal rotation (on the side at 13a), and position of the reverse rotation (on the side at 13b). An operation of the sliding switch 11 such as this is fetched as electric signals by a switching circuit 12 and is fetched into the CPU 16 in the zoom lens barrel 17 together with an auto-focus servo disabling signal from an auto-focus disabling unit 18. The structure is arranged so that in the CPU 16, the focusing signal from the focusing system which will be described later is reset by the auto-focus servo disabling signal, and only the zooming mechanism driving signals which are processed as power zooming signals are transmitted to the focusing driving motor 22 in the camera body 32 through electrical contacting points (not shown) in the zoom lens barrel 17 and the camera body 32.

The structure is arranged to allow the rotation of the focusing driving motor 22 is transmitted to the pinion gear 23 mounted on this driving motor 22, and by the gear 21a provided at one end of the coupling shaft 21, which engages with the aforesaid pinion gear 23, the rotation is further transmitted to the convex coupling portion 21b at the other end of the coupling shaft 21 on the camera body side projected from the camera body 32. Therefore, by mounting the zoom lens barrel 17 on the camera body 32, the convex coupling portion 21b on the camera body side and the concave coupling portion 10b on the lens side engage with each other to make it possible to perform an electrically driven zooming operation by the focusing driving motor 22.

Now, the structure of the focusing mechanism provided in the zoom lens barrel 17 will be described. This focusing mechanism performs the focusing by driving the focusing lens group L2. The focusing lens group L2 is held by a movable barrel 2. In the aforesaid movable barrel 2, there is mounted a focusing cam pin 8 which is fitted both to a groove 3b provided on the aforesaid fixed barrel 3 for the linear focusing advancement and a focusing cam groove 7a on the focusing cam barrel 7 by a screw coupling between the threaded portion of the aforesaid cam pin 8 and the grooves to regulate the movement of the focusing lens group L2 in the direction of thrust. The segmental gear 7c is cut at the end of the focusing cam barrel 7 to engage with the pinion gear 15 mounted on the focusing motor 14. Then, on the basis of the signals form the focusing system which will be described later, the focusing motor 14 is rotated for a driving amount calculated by the CPU 16 in the zoom lens barrel 17 to cause the focusing cam barrel 7 to be rotated. Also, on the aforesaid focusing cam barrel 7, a peripheral groove 7b is provided, and a pin 9 having the threaded portion, which is fixed to the fixed barrel 3 by the screw fitting, is fitted to the groove so as to regulate the movement of the focusing cam barrel 7 only in the rotational direction.

Subsequently, the description will be made of the structure of the focusing system which is mainly arranged in the camera body 32 side. The luminous film from an object passes through the photographing lenses (L1 and L2) to reach the main mirror 24 of the camera body 32, and the rays of light reflected by the aforesaid main mirror image the objective image on a focusing plate 25. This objective image is conducted to the eye of a photographer through a condenser lens 26, a pentagonal prism 27, and a finder ocular 28.

Also, the structure is arranged so that a part of the rays of light passing through the semitransparent portion of the main mirror 24 are reflected by a sub-mirror 29 to be guided to a metering photoelectric conversion unit 30. The output signals from the metering photoelectric conversion unit 30 is inputted into a known focusing control circuit 31. Then, the driving direction and driving amount of the focusing lens group L2 are determined by the aforesaid focusing control circuit 31. The driving signals corresponding to these driving direction and driving amount are transmitted to the CPU 16 in the zoom lens barrel 17 through the electrical contacting point which is not shown in FIG. 3. The structure is further arranged to allow the focusing motor 14 to be driven for the driving direction and driving amount corresponding to the aforesaid driving signals.

Now, the zooming operation of an apparatus of such a structure as above will be described. The sliding switch 11 which is placed at its neutral position (the position indicated in FIG. 3) is caused to slide in the direction apart from the camera body 32 so that a sliding member is in contact with a contact point 13a. Then, a signal is output from a switching circuit 12 for the normal rotation. This normal rotational signal is inputted into the CPU 16 through an auto-focus disabling unit 18. The aforesaid CPU 16 switches over the focusing driving signal generated by the focusing control circuit 31 in the camera body 31 to a zooming driving signal as a signal which will be applied to the driving motor 22 in the camera body 32 and applies it to the aforesaid driving motor 22. This zooming driving signal is transmitted to the driving motor through the electrical contacting point (not shown) between the zoom lens barrel 17 and the camera body 32. The aforesaid zooming driving signal includes a signal indicating the driving direction generated on the basis of the operating direction of the sliding switch 11. Thus, in accordance with such zooming driving signals, the motor 22 causes the pinion 23 to be rotated accordingly.

In this way, the rotational power is transmitted to the convex coupling portion 21b which is mounted on the other end of the coupling shaft 21 in the camera body side and is projected from the camera body 32, for example, to engage with the aforesaid pinion gear 23. This coupling portion engages with the coupling portion 10b on the zoom lens barrel side and with this rotational power thus transmitted, the coupling shaft 10 is allowed to rotate for the execution of the electrically driven zooming operation as described earlier. Also, if the aforesaid sliding switch 11 which is placed at the neutral position is caused to slide toward the camera body 22 side so that the sliding member is in contact with the contacting point 13b, the same operation as described above is executed to rotate the coupling shaft 10. Thus effectuating the electrically driven zooming. This time, however, the zooming direction is opposite to the one described in the above-mentioned case.

In this respect, while a focusing driving motor is provided separately in the lens barrel in the present embodiment, it may be possible to perform focusing and zooming operations by only a motor in the camera body with the provision of a focusing/zooming switch over mechanism in the lens barrel or in the camera body side.

As described above, according to the present invention, the zooming driving is performed by the focusing lens group driving motor provided outside the lens barrel. In other words, the driving power generated outside the aforesaid lens barrel is transmitted to the zooming lens group driving mechanism in the lens barrel. Therefore, it is possible to eliminate the disadvantage resulting from making the lenses barrel larger and its weight heavier due to the provision of a motor and its driving mechanism in the lens barrel only for the purpose of driving the zooming lens group.

Also, even when the provision of a focusing lens group driving motor in the lens barrel is desired for the purpose of obtaining an optimal performance of the driving speed and driving power, for example, in accordance with the various types of lenses, its zooming can be performed using the focusing driving mechanism in the camera body side. As a result, there is not need for providing a motor anew in the zoom lens barrel. It is therefore possible to prevent the lens barrel from being made larger and heavier and at the same time, to utilize the focusing driving mechanism provided in the camera body size efficiently. In this respect, if, for example, a conventional lens which is not provided with any auto-focus servo disabling unit therein is mounted, the focusing driving mechanism provided in the camera body side can perform to serve as driving the focusing lens group, and there is no possibility that an auto-focus operation by the conventional lens and others is hindered.

What is claimed is:

1. A power zooming lens barrel which can be mounted on a camera body having auto-focus driving means for performing an auto-focus operation, and which has an auto-focus driving means, separate from said auto-focus driving means of said camera body, for performing an auto-focus operation, comprising:
 a zooming driving mechanism which is coupled to said auto-focus driving means of said camera body for performing a zooming operation by driving power from said auto-focus driving means of said camera body;
 zooming control means for operating said zooming driving mechanism with said auto-focus driving means of said camera body when a zooming operation is actuated; and
 focusing control means for performing a focusing operation with said auto-focus driving means of said power zooming lens barrel when a focusing operation is actuated.

2. A power zooming lens barrel according to claim 1, further comprising:

auto-focus servo disabling means for generating an auto-focus servo disabling signal for resetting a focusing signal to allow said auto-focus driving means of said camera body to perform a focusing operation; and zooming signal generating means for generating a zooming signal to allow said auto-focus driving means of said camera body to perform a zooming operation, whereby when said zooming operation is actuated, said auto-focus servo disabling signal is generated by said auto-focus servo disabling means to said auto-focus driving means of said camera body while said zooming signal is generated by said zooming signal generating means to said auto-focus driving means of said camera body.

3. A camera system having a power zooming function, comprising:

a camera body having an auto-focus driving means for performing a focusing operation;

a power zooming lens barrel having auto-focus driving means separate from said auto-focus driving means of said camera body and a zooming driving mechanism which is coupled to said auto-focus driving means of said camera body for performing a zooming operation by driving power from said auto-focus driving means of said camera body;

zoom switching means for actuating a zooming operation;

zooming control means for operating said zooming driving mechanism with said auto-focus driving means of said camera body when a zooming operation is actuated by said zoom switching means; and focusing control means for performing a focusing operation with said auto-focus driving means of said power zooming lens barrel when a focusing operation is actuated.

4. A camera system according to claim 3, further comprising:

auto-focus servo disabling means for generating an auto-focus servo disabling signal for resetting a focusing signal to allow said auto-focus driving means of said camera body to perform a focusing operation; and zooming signal generating means for generating a zooming signal to allow said auto-focus driving means of said camera body to perform a zooming operation, whereby when said zooming operation is actuated by said zoom switching means, said auto-focus servo disabling signal is generated by said auto-focus servo disabling means to said auto-focus driving means of said camera body while said zooming signal is generated by said zooming signal generating means to said auto-focus driving means of said camera body.

* * * * *